US012681582B2

(12) United States Patent
Chen et al.

(10) Patent No.: US 12,681,582 B2
(45) Date of Patent: Jul. 14, 2026

(54) HAPTIC FEEDBACK SUBSTRATE AND DRIVING METHOD THEREFOR, AND TOUCH DEVICE

(71) Applicants: Beijing BOE Technology Development Co., Ltd., Beijing (CN); BOE Technology Group Co., Ltd., Beijing (CN)

(72) Inventors: Yuju Chen, Beijing (CN); Hui Hua, Beijing (CN); Yongchun Tao, Beijing (CN); Dexing Qi, Beijing (CN)

(73) Assignees: Beijing BOE Technology Development Co., Ltd., Beijing (CN); BOE Technology Grouup Co., Ltd., Beijing (CN)

( * ) Notice: Subject to any disclaimer, the term of this patent is extended or adjusted under 35 U.S.C. 154(b) by 0 days.

(21) Appl. No.: 18/994,133

(22) PCT Filed: Jan. 15, 2024

(86) PCT No.: PCT/CN2024/072281
§ 371 (c)(1),
(2) Date: Jan. 14, 2025

(87) PCT Pub. No.: WO2024/179200
PCT Pub. Date: Sep. 6, 2024

(65) Prior Publication Data
US 2026/0016897 A1     Jan. 15, 2026

(30) Foreign Application Priority Data
Feb. 27, 2023    (CN) .......................... 202310195123.4

(51) Int. Cl.
*G06F 3/01*      (2006.01)
*B06B 1/02*      (2006.01)

(52) U.S. Cl.
CPC ............ *G06F 3/016* (2013.01); *B06B 1/0276* (2013.01); *B06B 2201/55* (2013.01)

(58) Field of Classification Search
None
See application file for complete search history.

(56) References Cited

U.S. PATENT DOCUMENTS

2008/0084384 A1    4/2008   Gregorio et al.
2021/0342563 A1*  11/2021  Zhou ........................ C08L 53/00
2024/0184366 A1*   6/2024  Yang ........................ G06F 3/016

FOREIGN PATENT DOCUMENTS

CN        102347678 A    2/2012
CN        203084648 U    7/2013
(Continued)

OTHER PUBLICATIONS

CN202310195123.4 first office action dated Feb. 2, 2026.

*Primary Examiner* — Carl Adams
(74) *Attorney, Agent, or Firm* — IPro, PLLC

(57)                    ABSTRACT
A driving method for a haptic feedback substrate includes obtaining a haptic feedback signal required by a user; and driving the haptic feedback substrate to vibrate according to the haptic feedback signal. A first AC signal is loaded to a piezoelectric vibration unit of the haptic feedback substrate. A frequency of the first AC signal is greater than a frequency of the haptic feedback signal. The haptic feedback substrate is configured to resonate under an action of the first AC signal. At a stable vibration stage, the haptic feedback signal is loaded to the piezoelectric vibration unit. At a terminal vibration stage, a second AC signal is loaded to the piezoelectric vibration unit. A frequency of the second AC signal is a non-resonant frequency of the haptic feedback substrate. The frequency of the second AC signal is greater than the frequency of the haptic feedback signal.

14 Claims, 4 Drawing Sheets

(56)     References Cited

FOREIGN PATENT DOCUMENTS

| | | | |
|---|---|---|---|
| CN | 105446646 | A | 3/2016 |
| CN | 105630021 | A | 6/2016 |
| CN | 107257636 | A | 10/2017 |
| CN | 107783649 | A | 3/2018 |
| CN | 109365251 | A | 2/2019 |
| CN | 109815838 | A | 5/2019 |
| CN | 110380664 | A | 10/2019 |
| CN | 107122056 | B | 12/2019 |
| CN | 111580644 | A | 8/2020 |
| CN | 112534380 | A | 3/2021 |
| CN | 115250626 | A | 10/2022 |
| CN | 115606087 | A | 1/2023 |
| CN | 116243796 | A | 6/2023 |
| EP | 3462282 | A1 | 4/2019 |
| WO | 2009117125 | A1 | 9/2009 |

* cited by examiner

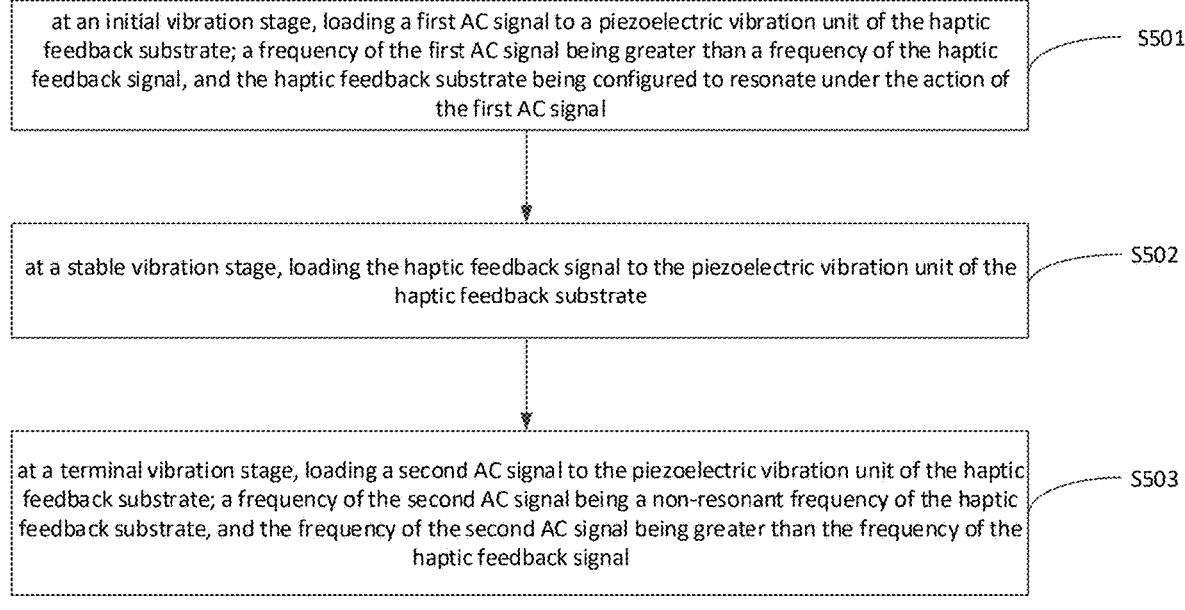

at an initial vibration stage, loading a first AC signal to a piezoelectric vibration unit of the haptic feedback substrate; a frequency of the first AC signal being greater than a frequency of the haptic feedback signal, and the haptic feedback substrate being configured to resonate under the action of the first AC signal — S501 at a stable vibration stage, loading the haptic feedback signal to the piezoelectric vibration unit of the haptic feedback substrate — S502 at a terminal vibration stage, loading a second AC signal to the piezoelectric vibration unit of the haptic feedback substrate; a frequency of the second AC signal being a non-resonant frequency of the haptic feedback substrate, and the frequency of the second AC signal being greater than the frequency of the haptic feedback signal — S503

FIG. 5

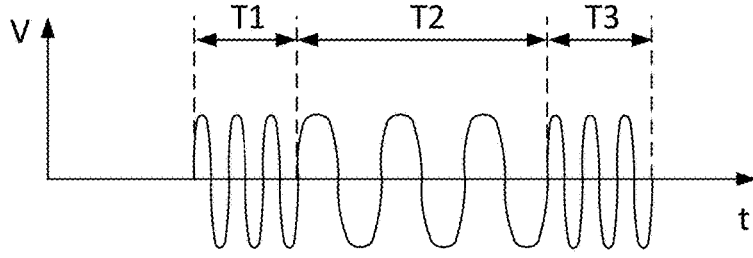

FIG. 6

FIG. 7

HAPTIC FEEDBACK SUBSTRATE AND DRIVING METHOD THEREFOR, AND TOUCH DEVICE

CROSS-REFERENCE TO RELATED APPLICATIONS

This application is a national phase entry under 35 U.S.C. § 371 of International Application No. PCT/CN2024/072281, filed on Jan. 15, 2024, which claims priority to Chinese Patent Application No. 202310195123.4, filed with the China National Intellectual Property Administration on Feb. 27, 2023 and entitled "Haptic Feedback Substrate and Driving Method therefor, and Touch Device", the entire contents of which are incorporated herein by reference.

TECHNICAL FIELD

The present disclosure relates to the technical field of haptic feedback, and in particular to a haptic feedback substrate, a driving method for the haptic feedback substrate, and a touch device.

BACKGROUND

Haptic feedback (Haptics) is a focus of today's technology development. Specifically, haptic feedback enables the human body to interact with a terminal through the sense of touch. Haptic feedback is divided into two categories: one is vibration feedback and the other is haptic reproduction technology.

With surface haptic reproduction technology, characteristics of objects can be perceived by a bare finger through touching a screen, and efficient and natural interaction on multimedia terminals can be realized. The surface haptic reproduction technology has great research value and has therefore received widespread attention from domestic and foreign researchers. In the physical sense, surface haptic is the effect of surface roughness of an object on the surface of the skin (fingertip). Different friction forces are formed due to different surface structures. Therefore, different haptic/tactile simulations may be realized by controlling the surface friction forces.

SUMMARY

Embodiments of the present disclosure provide a haptic feedback substrate, a driving method for the haptic feedback substrate, and a touch device.

Embodiments of the present disclosure provide a driving method for a haptic feedback substrate, including:

obtaining a haptic feedback signal required by a user, and driving the haptic feedback substrate to vibrate according to the haptic feedback signal.

The driving of the haptic feedback substrate to vibrate includes:

at an initial vibration stage, loading a first AC signal to a piezoelectric vibration unit of the haptic feedback substrate; a frequency of the first AC signal being greater than a frequency of the haptic feedback signal, and the haptic feedback substrate being configured to resonate under an action of the first AC signal;

at a stable vibration stage, loading the haptic feedback signal to the piezoelectric vibration unit of the haptic feedback substrate;

at a terminal vibration stage, loading a second AC signal to the piezoelectric vibration unit of the haptic feedback substrate; a frequency of the second AC signal being a non-resonant frequency of the haptic feedback substrate, and the frequency of the second AC signal being greater than the frequency of the haptic feedback signal.

In some embodiments, in the driving method according to embodiments of the present disclosure, the frequency of the first AC signal is a resonance frequency of the haptic feedback substrate.

In some embodiments, in the driving method according to embodiments of the present disclosure, the frequency of the first AC signal is greater than 20 kHz.

In some embodiments, in the driving method according to embodiments of the present disclosure, the time period of the initial vibration stage is less than 20 ms.

In some embodiments, in the driving method according to embodiments of the present disclosure, the frequency of the haptic feedback signal ranges from 100 Hz to 3000 Hz.

In some embodiments, in the driving method according to embodiments of the present disclosure, the frequency of the second AC signal is greater than 20 kHz.

In some embodiments, in the driving method according to embodiments of the present disclosure, the time period of the terminal vibration stage is less than 20 ms.

In some embodiments, in the driving method according to embodiments of the present disclosure, a waveform of the haptic feedback signal is the same as a waveform of the first AC signal.

In some embodiments, in the driving method according to embodiments of the present disclosure, a waveform transmission direction of the haptic feedback signal is the same as a waveform transmission direction of the first AC signal.

In some embodiments, in the driving method according to embodiments of the present disclosure, peaks in the waveform of the haptic feedback signal are in the same direction as peaks in the waveform of the first AC signal, and valleys in the waveform of the haptic feedback signal are in the same direction as valleys in the waveform of the first AC signal.

Correspondingly, embodiments of the present disclosure further provide a haptic feedback substrate, which is driven by the above-mentioned driving method according to embodiments of the present disclosure. The haptic feedback substrate includes: a base substrate, and a piezoelectric vibration unit on the base substrate.

In some embodiments, in the haptic feedback substrate according to embodiments of the present disclosure, the piezoelectric vibration unit is a PZT piezoelectric film structure or a piezoelectric ceramic block structure.

Correspondingly, embodiments of the present disclosure further provide a touch device, which includes a touch layer and the above-mentioned haptic feedback substrate according to embodiments of the present disclosure. The touch layer is located on a side of the base substrate away from the piezoelectric vibration unit.

In some embodiments, the touch device according to embodiments of the present disclosure further includes a display structure. The display structure is disposed between the touch layer and the base substrate.

BRIEF DESCRIPTION OF DRAWINGS

FIG. 5 is a schematic flow chart of a driving method for a haptic feedback substrate according to an embodiment of the present disclosure.

FIG. 6 is a schematic diagram of velocity (V)-time (t) corresponding to a frequency signal loaded to a piezoelectric vibration unit at an initial vibration stage (T1), a stable vibration stage (T2), and a terminal vibration stage (T3).

FIG. 7 is a schematic structural diagram of a haptic feedback substrate according to an embodiment of the present disclosure.

DETAILED DESCRIPTION

Figure 1:
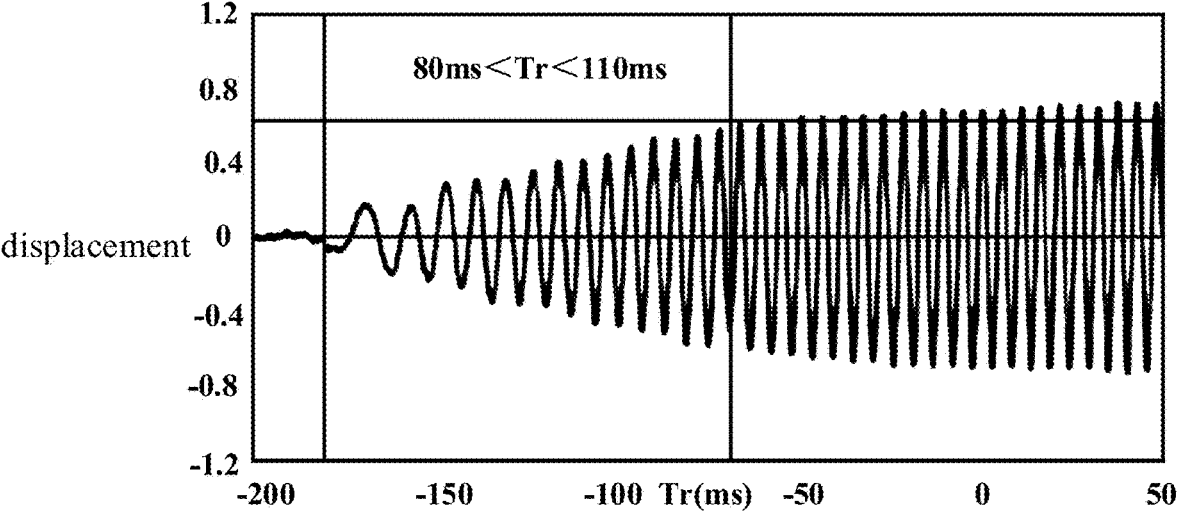
FIG. 1 is a schematic diagram of a vibration response speed corresponding to an ERM motor (Tr).

In order to make the purpose, technical solution and advantages of the embodiments of the present disclosure more clear, the technical solution of the embodiments of the present disclosure will be clearly and completely described below in conjunction with the drawings of the embodiments of the present disclosure. Obviously, the described embodiments are only part of the embodiments of the present disclosure, rather than all the embodiments. Furthermore, the embodiments in the present disclosure and the features in the embodiments may be combined with each other without conflict. Based on the described embodiments of the present disclosure, all other embodiments obtained by those of ordinary skill in the art without creative work are within the scope of protection of the present disclosure.

Unless otherwise defined, technical or scientific terms used in the present disclosure should have the common meanings understood by a person having ordinary skills in the art to which the present disclosure belongs. The words "include" or "comprise" and the like used in the present disclosure mean that the elements or objects preceding the words include the elements or objects listed after the words and their equivalents, but do not exclude other elements or objects. The words "connect" or "connected" and the like are not limited to physical or mechanical connections, but may include electrical connections, whether direct or indirect. "Inside", "outside", "upper", "lower", etc. are only used to indicate relative position relationships. When the absolute position of the object being described changes, the relative position relationship may also change accordingly.

It should be noted that the size and shape of each figure in the accompanying drawings do not reflect the actual proportion, and the purpose is only to illustrate the contents of the present disclosure. And the same or similar reference numerals throughout represent the same or similar elements or elements having the same or similar functions.

Figure 2:
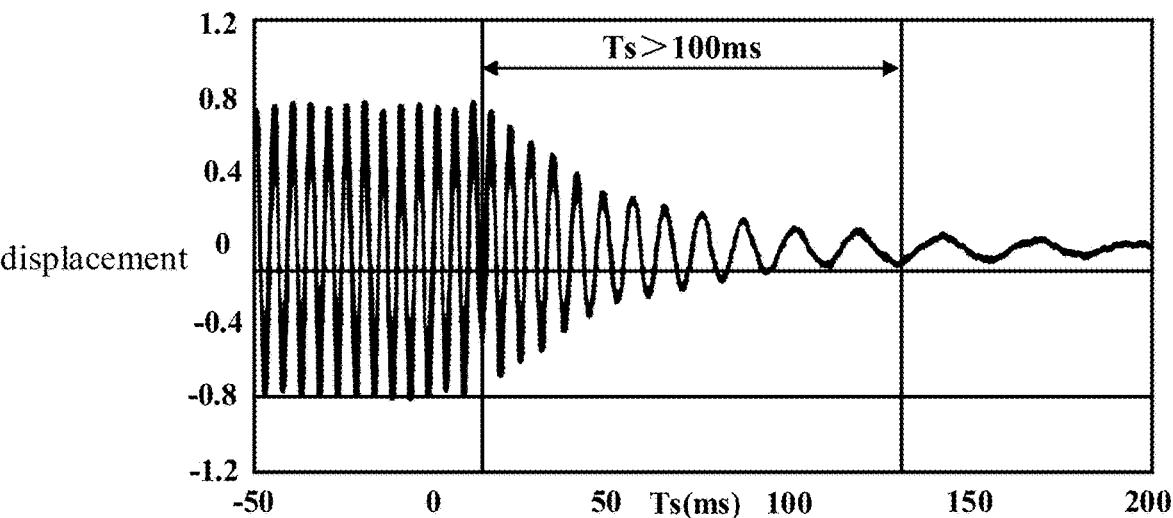
FIG. 2 is a schematic diagram of a vibration response speed corresponding to an ERM motor (Ts).
Figure 3:
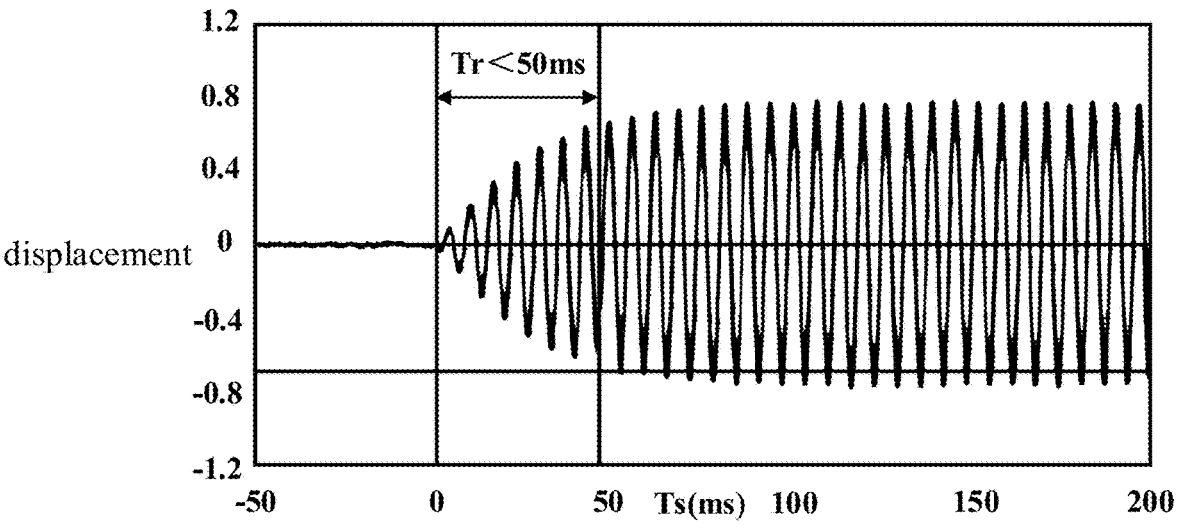
FIG. 3 is a schematic diagram of a vibration response speed corresponding to an LRA motor (Tr).
Figure 4:
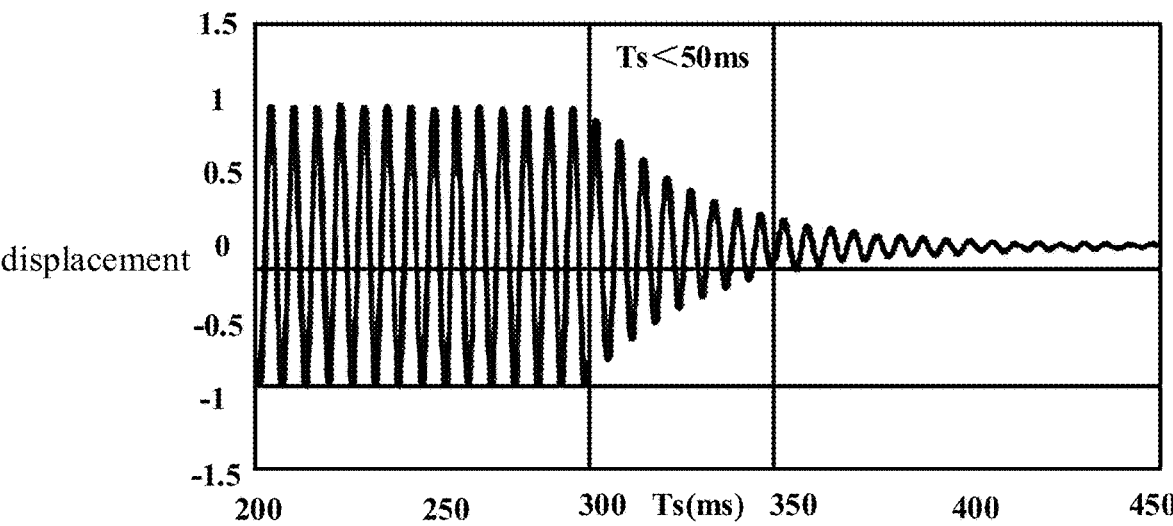
FIG. 4 is a schematic diagram of a vibration response speed corresponding to an LRA motor (Ts).

Vibration haptic feedback means using a vibration motor with different vibration frequencies and waveforms to generate feedback and a button feel. In traditional touch panel technology, a mechanical structure with a capacitive touch panel in a press feedback principle is adopted. Then, Apple released the Magic Keyboard, which uses a vibration motor to replace the traditional mechanical structure and generates a button feel through different vibration frequencies and waveforms. Later, Huawei proposed using the displacement deformation of piezoelectric sheets to generate a button feel, further forming a piezoelectric touch panel, and applied it to notebook models such as Matebook. The time points when vibration occurs and stops are particularly important, because the human haptic perception threshold is about 20 ms (Tr, rising time). If the vibration sense occurs at a time which is more than 20 ms after human-computer interaction, it will cause the user to have a lag haptic experience, which is a behavior that haptic feedback devices try their best to avoid. In addition, after stopping the human-computer interaction (Ts, stopping time), the vibration (<10% amplitude, i.e., <1 um) is also required to reach the outside of the sensing range of the human finger within 20 ms to avoid the user's feeling of lag touch response. As shown in FIGS. 1 to 4, FIGS. 1 and 2 are schematic diagrams (Tr and Ts) of vibration response speed corresponding to ERM motor, and FIGS. 3 and 4 are schematic diagrams (Tr and Ts) of vibration response speed corresponding to LRA motor. Regardless of the ERM motor or the LRA motor, the response speed cannot meet the requirements. As shown in FIGS. 1 and 2, the Tr and Ts corresponding to the ERM motor are both close to 100. This is mainly limited by the principle of the motor. When the mechanical eccentric rotor moves, closing of the electrical signal often produces a lag inertial vibration, so the response speed cannot be controlled to be <20 ms. In FIGS. 3 and 4, the LRA motor uses an electromagnetic coil to drive the mass to move. Although the response speed of the LRA motor is much higher than that of the ERM motor, it is still affected by inertia and gravity, so Tr (<50 ms) and Ts (<50 ms) cannot reach the 20 ms level. Therefore, how to improve the vibration response speed of the haptic feedback substrate is a technical problem that those skilled in the art need to solve urgently.

In view of this, embodiments of the present disclosure provide a driving method for a haptic feedback substrate.

The driving method includes: obtaining a haptic feedback signal required by a user, and driving the haptic feedback substrate to vibrate according to the haptic feedback signal. As shown in FIG. 5, driving the haptic feedback substrate to vibrate includes:

S501, at an initial vibration stage, loading a first AC signal to a piezoelectric vibration unit of the haptic feedback substrate; a frequency of the first AC signal being greater than a frequency of the haptic feedback signal, and the haptic feedback substrate being configured to resonate under the action of the first AC signal;

S502, at a stable vibration stage, loading the haptic feedback signal to the piezoelectric vibration unit of the haptic feedback substrate;

S503, at a terminal vibration stage, loading a second AC signal to the piezoelectric vibration unit of the haptic feedback substrate; a frequency of the second AC signal being a non-resonant frequency of the haptic feedback substrate, and the frequency of the second AC signal being greater than the frequency of the haptic feedback signal.

In the driving method for the haptic feedback substrate according to embodiments of the present disclosure, a high-frequency signal that has a frequency higher than the frequency of the haptic feedback signal and can make the haptic feedback substrate resonate is loaded to the piezoelectric vibration unit at the initial vibration stage, so as to enable the haptic feedback substrate to quickly start vibrating and improve the response speed of the initial vibration. A high-frequency non-resonant signal that has a frequency higher than the frequency of the haptic feedback signal is loaded to the piezoelectric vibration unit at the terminal vibration stage, so as to enable the haptic feedback substrate to quickly stop vibrating and improve the response speed of the terminal vibration. In this way, the user can avoid the feeling of lag haptic response and thus improve the user experience.

It should be noted that the human haptic perception threshold is about 20 ms. If the sense of the vibration occurs at a time which is more than 20 ms after starting human-computer interaction, the user will feel a delay in the haptic response. Therefore, the initial vibration stage refers to the haptic perception time for the human, and the stable vibration stage refers to the stable time of human-computer interaction (the length of time depends on demand). If the sense of stopping vibration occurs at a time which is more than 20 ms after stopping the human-computer interaction, the user will also feel a delay in the haptic response. Therefore, the terminal vibration stage refers to the haptic perception stopping time for the human.

In some embodiments, when the piezoelectric vibration unit vibrates to drive the haptic feedback substrate to resonate, the haptic feedback substrate has a resonance point and a non-resonance point. The frequency corresponding to the resonance point (i.e., the resonance frequency) is loaded onto the piezoelectric vibration unit, and the electromechanical conversion efficiency corresponding to the resonance frequency is high, which can further improve the vibration effect of the haptic feedback substrate and enable the piezoelectric vibration unit to start vibrating quickly. The frequency corresponding to the non-resonance point (non-resonance frequency) is loaded onto the piezoelectric vibration unit, which can enable the piezoelectric vibration unit to stop vibrating quickly. Therefore, in the driving method according to embodiments of the present disclosure, at the initial vibration stage, the frequency of the first AC signal loaded to the piezoelectric vibration unit of the haptic feedback substrate is the resonance frequency of the haptic feedback substrate.

In some embodiments, in the above-mentioned driving method according to embodiments of the present disclosure, as shown in FIG. 6, FIG. 6 is a schematic diagram of velocity (V) to time (t) corresponding to a frequency signal loaded to the piezoelectric vibration unit at the initial vibration stage (T1), the stable vibration stage (T2), and the terminal vibration stage (T3), respectively. At the initial vibration stage (T1), the frequency of the first AC signal loaded to the piezoelectric vibration unit of the haptic feedback substrate is greater than 20 kHz, which will reduce noise problems. Of course, under certain requirements (such as screen sound), the frequency of the first AC signal may also be less than or equal to 20 kHz. For example, the frequency of the first AC signal may be greater than 3000 Hz and less than or equal to 20 kHz.

In some embodiments, in the above-mentioned driving method according to embodiments of the present disclosure, as shown in FIG. 6, since a high-frequency resonance signal which has a frequency higher than the frequency of the haptic feedback signal is loaded to the piezoelectric vibration unit at the initial vibration stage (T1), the haptic feedback substrate can quickly start to vibrate. When the frequency of the first AC signal is greater than 20 kHz, the time period of the initial vibration stage can be less than 20 ms, thereby avoiding the user's feeling of lag haptic response and improving the user experience.

In some embodiments, in the above-mentioned driving method according to embodiments of the present disclosure, as shown in FIG. 6, at the stable vibration stage of (T2), the frequency of the haptic feedback signal loaded to the piezoelectric vibration unit of the haptic feedback substrate can be 100 Hz to 3000 Hz. The vibration waveform of the haptic feedback substrate in this frequency range conforms to human haptic perception. That is, the vibration frequency in this frequency range is required by humans, and thus a good haptic feedback effect can be obtained.

In some embodiments, in the above-mentioned driving method according to embodiments of the present disclosure, as shown in FIG. 6, the time period of the stable vibration stage (T2) may be less than 100 ms, and a haptic feedback effect is achieved during this time period.

In some embodiments, in the above-mentioned driving method according to embodiments of the present disclosure, as shown in FIG. 6, at the terminal vibration stage (T3), the frequency of the second AC signal loaded to the piezoelectric vibration unit of the haptic feedback substrate may be greater than 20 kHz, which will reduce noise problems. Of course, under certain requirements (such as screen sound), the frequency of the second AC signal may also be less than or equal to 20 kHz. For example, the frequency of the second AC signal may also be greater than 3000 Hz and less than or equal to 20 kHz.

In some embodiments, in the above-mentioned driving method according to embodiments of the present disclosure, as shown in FIG. 6, since a high-frequency non-resonant signal which has a frequency higher than the frequency of the haptic feedback signal is loaded to the piezoelectric vibration unit at the terminal vibration stage (T3), the haptic feedback substrate can quickly stop vibrating. When the frequency of the second AC signal is greater than 20 kHz, the time period of the terminal vibration stage can be less than 20 ms, thereby avoiding the user's feeling of lag haptic response and improving the user experience.

It should be noted that the waveforms of the first AC signal, the second AC signal and the haptic feedback signal are generally sinusoidal waves. The waveforms shown in FIG. 6 are only schematic illustrations and do not represent real waveforms. The corresponding waveforms can be determined according to the frequency signals loaded at each stage.

In some embodiments, in the above-mentioned driving method according to embodiments of the present disclosure, since the haptic feedback substrate needs to resonate at both the initial vibration stage and the stable vibration stage, the waveform of the haptic feedback signal at the stable vibration stage needs to be the same as the waveform of the first AC signal at the initial vibration stage. For example, the waveform transmission direction of the haptic feedback signal is the same as the waveform transmission direction of the first AC signal. The peaks in the waveform of the haptic feedback signal are in the same direction as the peaks in the waveform of the first AC signal. The valleys in the waveform of the haptic feedback signal are in the same direction as the valleys in the waveform of the first AC signal.

Based on the same inventive concept, embodiments of the present disclosure further provide a haptic feedback substrate. The haptic feedback substrate is driven by the above-mentioned driving method according to embodiments of the present disclosure. As shown in FIG. 7, the haptic feedback substrate may include: a base substrate 10, and a piezoelectric vibration unit 20 on the base substrate 10. Since the principle of solving the problem by the haptic feedback substrate is similar to that by the aforementioned driving method for the haptic feedback substrate, the implementation of the haptic feedback substrate can refer to the implementation of the aforementioned driving method for the haptic feedback substrate, and the repeated parts will not be repeated.

In some embodiments, in the above-mentioned haptic feedback substrate according to embodiments of the present disclosure, the piezoelectric vibration unit may be a PZT piezoelectric film structure or a piezoelectric ceramic block structure. This can significantly reduce the thickness of the piezoelectric circuit/piezoelectric vibration unit, making the haptic feedback substrate lighter and thinner.

Optionally, as shown in FIG. 7, a plurality of piezoelectric vibration units 20 may be disposed on the base substrate 10. The plurality of piezoelectric vibration units 20 are distributed in an array, but the present invention is not limited thereto.

Optionally, taking the piezoelectric vibration unit as a PZT piezoelectric film structure as an example, the piezoelectric vibration unit may include a first electrode layer, a piezoelectric material layer and a second electrode layer that are stacked. The first electrode layer may be grounded. The second electrode layer may be connected to a driving signal terminal. By utilizing the inverse piezoelectric effect, a high-frequency AC voltage signal ($V_{AC}$) is loaded to the second electrode layer to apply a high-frequency AC voltage signal to the piezoelectric material layer, thereby generating high-frequency vibration. Laser may be used to measure the vibration displacement, thereby ensuring the performance of the haptic feedback substrate.

In some embodiments, the material of the first electrode layer and the second electrode layer is a transparent conductive material, such as indium tin oxide (ITO) or indium zinc oxide (IZO). Technicians in this field can set the material of the first electrode layer and the second electrode layer according to actual application requirements, and there is no limitation here.

In some embodiments, the piezoelectric material layer is not limited to the lead zirconate titanate ($Pb(Zr,Ti)O_3$, PZT) mentioned above, but can also be at least one of aluminum nitride (AlN), zinc oxide (ZnO), barium titanate ($BaTi_3$), lead titanate ($PbTiO_3$), potassium niobate ($KNbO_3$), lithium niobate ($LiNbO_3$), lithium tantalate ($LiTaO_3$), and lanthanum gallium silicate ($La_3Ga_5SiO_{14}$). In this way, while taking into account the transparency of the haptic feedback substrate, the vibration characteristics of the haptic feedback substrate are guaranteed. The material for making the piezoelectric material layer can be selected according to the actual use needs of technicians in this field, and no limitation is made here. When PZT is used to make the piezoelectric material layer, since PZT has a high piezoelectric coefficient, the piezoelectric characteristics of the haptic feedback substrate are guaranteed, and the corresponding haptic feedback substrate can be applied to a haptic feedback device. In addition, PZT has high light transmittance. When PZT is integrated into a display device, the display quality of the display device will not be affected.

The haptic feedback substrate according to embodiments of the present disclosure can be applied to fields such as medical treatment, automotive electronics, and sports tracking systems. It is particularly suitable for the field of wearable devices, monitoring and treatment outside the body or implanted inside the human body, or for use in the field of electronic skin for artificial intelligence. For example, piezoelectric sensors can be applied to brake pads, keyboards, mobile terminals, game controllers, vehicle-mounted devices, and other devices that can generate vibration and mechanical properties.

In some embodiments, the haptic feedback substrate can be combined with a touch screen. The touch screen can be used to determine the position of human touch, thereby generating corresponding vibration waveforms, amplitudes, and frequencies, and realizing human-computer interaction. For another example, the haptic feedback device can be reused as a piezoelectric body. The position of human touch can be determined by a piezoelectric sensor, thereby generating a corresponding vibration waveform, amplitude and frequency, and realizing human-computer interaction. Of course, the haptic feedback device can also be applied to the fields of medical treatment, automotive electronics, sports tracking systems, etc. according to actual needs, which will not be described in detail here.

Figure 8:
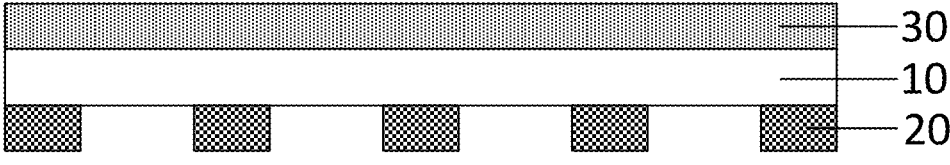
FIG. 8 is a schematic structural diagram of a touch device according to an embodiment of the present disclosure.

Based on the same inventive concept, embodiments of the present disclosure further provide a touch device, as shown in FIG. 8, including a touch layer 30 and the above-mentioned haptic feedback substrate according to embodiments of the present disclosure. The touch layer 30 is located on a side of the base substrate 10 away from the piezoelectric vibration unit 20. Since the principle of solving the problem by the touch device is similar to that by the aforementioned haptic feedback substrate, the implementation of the touch device can refer to the implementation of the aforementioned haptic feedback substrate, and the repeated parts will not be repeated.

For example, as shown in FIG. 8, the touch layer 30 is used to realize the touch function of the touch device. The structure of the touch layer 30 can be designed according to actual needs. For example, the touch layer 30 can be a capacitive touch layer, a resistive touch layer or an infrared touch layer, etc., which is not limited in embodiments of the present disclosure. For example, the capacitive touch layer may include touch driving electrodes, touch sensing electrodes, touch wires, and the like.

Optionally, the touch device may be a touch panel, a touch display panel, a terminal device with a touch panel such as a virtual reality device or a touch screen display device, etc., which is not limited in embodiments of the present disclosure.

Figure 9:
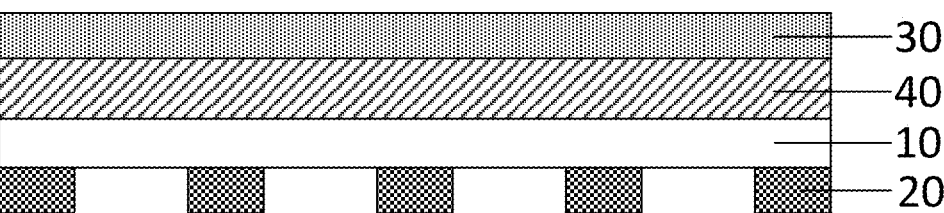
FIG. 9 is a schematic structural diagram of another touch device according to an embodiment of the present disclosure.

In some embodiments, when the touch device is a device with a display function, as shown in FIG. 9, the touch device further includes a display structure 40. The display structure 40 is disposed between the touch layer 30 and the base substrate 10. The display structure 40 is used to realize the display function. For example, the display structure 40 may include pixel units, etc. The structure of the display structure 40 can be found in the relevant technology and will not be described in detail here.

In some embodiments process, the base substrate may be a substrate made of glass, a substrate made of silicon or silicon dioxide ($SiO_2$), a substrate made of sapphire, or a substrate made of a metal wafer. There is no limitation here, and technicians in this field can set the base substrate according to actual application needs.

In the haptic feedback substrate, the driving method for the haptic feedback substrate, and the touch device according to embodiments of the present invention, a high-frequency signal which has a frequency higher than that of the haptic feedback signal and can cause the haptic feedback substrate to resonate is loaded to a piezoelectric vibration unit at the initial vibration stage, so as to enable the haptic feedback substrate to quickly start vibrating and improve the response speed of the initial vibration. A high-frequency non-resonant signal which has a frequency higher than that of the haptic feedback signal is loaded to the piezoelectric vibration unit at the terminal vibration stage, so as to enable the haptic feedback substrate to quickly stop vibrating and improve the response speed of the terminal vibration. In this way, the user can avoid the feeling of lag haptic response and thus improve the user experience.

Although preferred embodiments of the present disclosure have been described, additional changes and modifications may be made to these embodiments once those skilled in the art are aware of the basic inventive concepts. Therefore, it is intended that the appended claims be interpreted as including the preferred embodiment as well as all changes and modifications that fall within the scope of the present disclosure.

Obviously, those skilled in the art can make various changes and modifications to the embodiments of the present disclosure without departing from the spirit and scope of the embodiments of the present disclosure. Thus, if these modifications and variations of the embodiments of the present disclosure fall within the scope of the claims of the present disclosure and their equivalents, the present disclosure is also intended to include these modifications and variations.

What is claimed is:

1. A driving method for a haptic feedback substrate, comprising:

obtaining a haptic feedback signal required by a user; and driving the haptic feedback substrate to vibrate according to the haptic feedback signal;

wherein said driving the haptic feedback substrate to vibrate comprises:

at an initial vibration stage, loading a first AC signal to a piezoelectric vibration unit of the haptic feedback substrate; a frequency of the first AC signal being greater than a frequency of the haptic feedback signal, and the haptic feedback substrate being configured to resonate under an action of the first AC signal;

at a stable vibration stage, loading the haptic feedback signal to the piezoelectric vibration unit of the haptic feedback substrate;

at a terminal vibration stage, loading a second AC signal to the piezoelectric vibration unit of the haptic feedback substrate; a frequency of the second AC signal being a non-resonant frequency of the haptic feedback substrate, and the frequency of the second AC signal being greater than the frequency of the haptic feedback signal.

2. The driving method according to claim 1, wherein the frequency of the first AC signal is a resonant frequency of the haptic feedback substrate.

3. The driving method according to claim 2, wherein the frequency of the first AC signal is greater than 20 KHz.

4. The driving method according to claim 3, wherein a time period of the initial vibration stage is less than 20 ms.

5. The driving method according to claim 1, wherein the frequency of the haptic feedback signal ranges from 100 Hz to 3000 Hz.

6. The driving method according to claim 1, wherein the frequency of the second AC signal is greater than 20 KHz.

7. The driving method according to claim 6, wherein a time period of the terminal vibration stage is less than 20 ms.

8. The driving method according to claim 1, wherein a waveform of the haptic feedback signal is the same as a waveform of the first AC signal.

9. The driving method according to claim 8, wherein a waveform transmission direction of the haptic feedback signal is the same as a waveform transmission direction of the first AC signal.

10. The driving method according to claim 9, wherein peaks in the waveform of the haptic feedback signal are in the same direction as peaks in the waveform of the first AC signal, and valleys in the waveform of the haptic feedback signal are in the same direction as valleys in the waveform of the first AC signal.

11. A haptic feedback substrate driven by the driving method according to claim 1, wherein the haptic feedback substrate comprises:

a base substrate, and a piezoelectric vibration unit on the base substrate.

12. The haptic feedback substrate according to claim 11, wherein the piezoelectric vibration unit is a PZT piezoelectric film structure or a piezoelectric ceramic block structure.

13. A touch device, comprising:

a touch layer, and the haptic feedback substrate according to claim 11, wherein the touch layer is located on a side of the base substrate away from the piezoelectric vibration unit.

14. The touch device according to claim 13, further comprising:

a display structure, wherein the display structure is disposed between the touch layer and the base substrate.

* * * * *